(12) United States Patent
Miura et al.

(10) Patent No.: US 11,371,577 B2
(45) Date of Patent: Jun. 28, 2022

(54) SHOCK ABSORBING MEMBER AND METHOD OF MANUFACTURING THE SAME

(71) Applicants: TOYOTA SHATAI KABUSHIKI KAISHA, Kariya (JP); TOYOTA JIDOSHA KABUSHIKI KAISHA, Toyota (JP)

(72) Inventors: Toshihisa Miura, Kariya (JP); Junichi Takayanagi, Nagoya (JP); Kazunari Kojio, Toyota (JP); Munetaka Hayakawa, Toyota (JP)

(73) Assignees: TOYOTA SHATAI KABUSHIKI KAISHA, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 16/793,440

(22) Filed: Feb. 18, 2020

(65) Prior Publication Data
US 2020/0263752 A1 Aug. 20, 2020

(30) Foreign Application Priority Data
Feb. 18, 2019 (JP) .............................. JP2019-026415

(51) Int. Cl.
*F16F 7/12* (2006.01)
*B60R 19/18* (2006.01)
*B62D 21/15* (2006.01)

(52) U.S. Cl.
CPC ................ *F16F 7/12* (2013.01); *B60R 19/18* (2013.01); *B60R 2019/1813* (2013.01); *B62D 21/152* (2013.01); *F16F 2224/02* (2013.01); *F16F 2224/0208* (2013.01); *F16F 2226/04* (2013.01)

(58) Field of Classification Search
CPC ........ F16F 7/12; F16F 2226/04; F16F 2224/02; F16F 2224/0208; B60R 2019/1813
See application file for complete search history.

(56) References Cited

U.S. PATENT DOCUMENTS

| | | |
|---|---|---|
| 2013/0306419 A1 | 11/2013 | Okuda |
| 2014/0346789 A1 | 11/2014 | Okuda |
| 2016/0264082 A1* | 9/2016 | Berger ................ B29C 44/5681 |
| 2016/0272137 A1* | 9/2016 | Nishimura .............. F16F 7/003 |
| 2019/0084512 A1 | 3/2019 | Takayanagi et al. |

(Continued)

FOREIGN PATENT DOCUMENTS

| | | |
|---|---|---|
| DE | 10 2010 015 972 A1 | 9/2011 |
| EP | 3 604 044 A1 | 2/2020 |
| JP | 2001-153169 A | 6/2001 |

(Continued)

OTHER PUBLICATIONS

Jul. 13, 2020 Extended Search Report issued in European Patent Application No. 20157090.0.

*Primary Examiner* — Melanie Torres Williams
(74) *Attorney, Agent, or Firm* — Oliff PLC

(57) ABSTRACT

A shock absorbing member includes an outer member being hollow and made of a metal, and an inner member held in the outer member. The inner member includes a wood member and a bracket that is made of a solid resin or a metal and that is integral with the wood member. The inner member includes a holding structure configured to position and hold the bracket to the outer member.

10 Claims, 9 Drawing Sheets

(56) References Cited

U.S. PATENT DOCUMENTS

2019/0283698 A1    9/2019   Miura et al.

FOREIGN PATENT DOCUMENTS

| | | | | |
|---|---|---|---|---|
| JP | 2012-132552 A | | 7/2012 | |
| JP | 2014184899 A | * | 10/2014 | |
| JP | 2019-051833 A | | 4/2019 | |
| JP | 2020-59441 A | | 4/2020 | |
| WO | 2013/164931 A1 | | 11/2013 | |
| WO | 2018/100791 A1 | | 6/2018 | |
| WO | WO-2018100791 A1 | * | 6/2018 | ............ B29C 45/14 |
| WO | 2018/173377 A1 | | 9/2018 | |

* cited by examiner

SHOCK ABSORBING MEMBER AND METHOD OF MANUFACTURING THE SAME

CROSS-REFERENCE TO RELATED APPLICATION

This application claims priority to Japanese Patent Application No. 2019-026415 filed on Feb. 18, 2019, incorporated herein by reference in its entirety.

BACKGROUND

1. Technical Field

The disclosure relates to a shock absorbing member including a hollow metal outer member and an inner member held in the outer member, and to a method of manufacturing the same.

2. Description of Related Art

In a vehicle, a hollow metal member corresponding to the outer member of the disclosure is often used as a vehicle exterior component or a vehicle interior component, and, for example, a bumper reinforcement at the front of the vehicle can be given as one example thereof. While it is conceivable that the load is applied to the hollow metal member from the outside, the situation where the hollow metal member is locally largely bent (the occurrence of local folding) due to this load application should be avoided as much as possible. In view of this, it may be suggested to prevent the occurrence of unintended local folding as much as possible by absorbing the load applied to the hollow metal member by the use of, for example, a wood member with excellent shock absorption performance.

A shock absorbing member disclosed in Japanese Unexamined Patent Application Publication No. 2001-153169 (JP 2001-153169 A) includes a metal strength member, a core member, and a support member. The metal strength member is a hollow metal columnar member and corresponds to the outer member of the disclosure. The core member is a member made of fiber reinforced plastic (FRP) and corresponds to the inner member of the disclosure. The core member has external dimensions smaller than those of the metal strength member and can be disposed with an appropriate gap between itself and an inner wall of the metal strength member. In JP 2001-153169 A, the support member made of foamed urethane resin is filled in the gap between the metal strength member and the core member, thereby holding the core member of short length in the metal strength member via the support member. Consequently, when the load is applied to the metal strength member, the metal strength member is first deformed and then the core member is deformed so that the applied load can be absorbed. Accordingly, it may be suggested to employ the configuration of JP 2001-153169 A to position and hold the wood member (the inner member) in the hollow metal member (the outer member).

SUMMARY

In the case where the configuration of JP 2001-153169 A is employed as referred to above, the wood member (the inner member) is held in the hollow metal member (the outer member) via the support member made of foamed urethane resin. However, the support member made of foamed urethane resin is a member that is soft and tends to degrade over time compared to the wood member, and thus is unsuitable for holding the wood member to the hollow metal member while ensuring good performance. That is, the positioning accuracy of the wood member is difficult to achieve with the configuration using the soft support member, and the support member that tends to degrade over time is not a configuration that can easily be employed, taking into account the durability and so on. The disclosure provides a shock absorbing member that can hold an inner member to an outer member while ensuring good performance, and a method of manufacturing such a shock absorbing member.

A first aspect of the disclosure relates to a shock absorbing member that can absorb the load, applied to a hollow metal outer member, by the outer member and an inner member held in the outer member. In this type of shock absorbing member, it is desirable to be able to hold the inner member to the outer member while ensuring good performance (e.g. while maintaining excellent positioning performance). Therefore, the shock absorbing member according to the first aspect of the disclosure includes an outer member being hollow and made of a metal, and an inner member held in the outer member. The inner member includes a wood member and a bracket that is made of a solid resin or a metal and that is integral with the wood member. The inner member includes a holding structure configured to position and hold the bracket to the outer member. In the inner member according to the first aspect of the disclosure, the bracket harder than a foamed resin and excellent in durability is integrated with the wood member. By positioning and holding the bracket to the outer member by the holding structure, it is possible to hold the inner member to the outer member while maintaining excellent positioning performance.

In the above-described aspect, the outer member may include a general portion extending in a predetermined direction in a state where the wood member is disposed in the general portion, and a bent-deformed portion bent and deformed in a predetermined direction with respect to the general portion, and the holding structure may be configured to position and hold a bracket portion bent and deformed to be in close contact with the bent-deformed portion. With this configuration, by providing the bent-deformed portion to the outer member, it is possible to prevent the movement of the inner member relative to the general portion as much as possible. Further, by positioning and holding the bracket in the state where the bracket is in close contact with the bent-deformed portion by the holding structure, a configuration is provided that contributes to achieving excellent positioning performance for the inner member.

In the above-described aspect, the wood member may have an outer surface portion extending in a longitudinal direction, and the bracket portion integrated with the outer surface portion may have a length equal to or greater than a length of the outer surface portion in the longitudinal direction. With this configuration, since the dimension of the bracket portion for providing the holding structures is ensured, a configuration is provided that further contributes to achieving excellent positioning performance for the inner member.

In the above-described aspect, the bracket may be provided to envelop the wood member. With this configuration, degradation of the wood member due to external stimulus can be prevented as much as possible by the bracket disposed around the wood member.

In the above-described aspect, the bracket may be made of a solid resin having flexibility. With this configuration, a configuration is provided that contributes to weight reduction of the shock absorbing member by forming the bracket of the solid resin that is lighter than a metal. The outer member may have a columnar shape or a tubular shape, and the wood member may have an elongated columnar shape or an elongated tubular shape.

A second aspect of the disclosure relates to a manufacturing method for a shock absorbing member that can absorb the load, applied to a hollow metal outer member, by the outer member and an inner member held in the outer member. According to the second aspect of the disclosure, a manufacturing method for a shock absorbing member including an outer member being hollow and made of a metal, and an inner member held in the outer member, includes forming the inner member by integrating a wood member and a bracket made of a solid resin or a metal, disposing the inner member in a base member to be the outer member, then bending and deforming at least a part of the base member along with the bracket to form a bent-deformed portion, and positioning and holding the bracket to the outer member. With this configuration, by providing the bent-deformed portion to the outer member through the bending process, it is possible to prevent the movement of the inner member relative to the outer member as much as possible. Since the bracket is bent and deformed along with the bent-deformed portion so as to be in close contact with the bent-deformed portion, it is possible to hold the inner member to the outer member while maintaining excellent positioning performance.

In the above-described aspect, the positioning and holding may be positioning and holding a bracket portion to the bent-deformed portion, the bracket portion bent and deformed along with the bent-deformed portion. With this configuration, the predetermined bracket portion is bent and deformed along with the bent-deformed portion so as to be in close contact with the bent-deformed portion and can be positioned and held more reliably by the holding structure that is provided after the bending process.

In the above-described aspect, the bracket portion bent and deformed along with the bent-deformed portion may be disposed to protrude from the wood member. With this configuration, the predetermined protruding bracket portion can be bent and deformed smoothly with as little influence from the wood member as possible and thus can be positioned and held to the outer member more appropriately.

In the above-described aspect, a general portion extending in a predetermined direction in a state where the wood member is disposed and the bent-deformed portion bent and deformed in an appropriate direction with respect to the general portion may be formed by the bending and deforming, and the bent-deformed portion may be formed on each of both end sides of the general portion in an extending direction of the general portion, along with the bracket portion bent and deformed along with the bent-deformed portion. With this configuration, the movement of the inner member relative to the general portion can be prevented more reliably by the bent-deformed portions that are respectively provided at both ends of the general portion.

According to the first aspect of the disclosure, it is possible to hold the inner member to the outer member while ensuring good performance. A configuration can be provided that contributes to achieving excellent positioning performance for the inner member. A configuration can be provided that further contributes to achieving excellent positioning performance for the inner member. It is possible to hold the inner member to the outer member while ensuring better performance. It is possible to hold the inner member to the outer member while ensuring even better performance. According to the second aspect of the disclosure, it is possible to hold the inner member to the outer member while ensuring good performance. A configuration can be provided that contributes to achieving excellent positioning performance for the inner member. A configuration can be provided that further contributes to achieving excellent positioning performance for the inner member. A configuration can be provided that even further contributes to achieving excellent positioning performance for the inner member.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
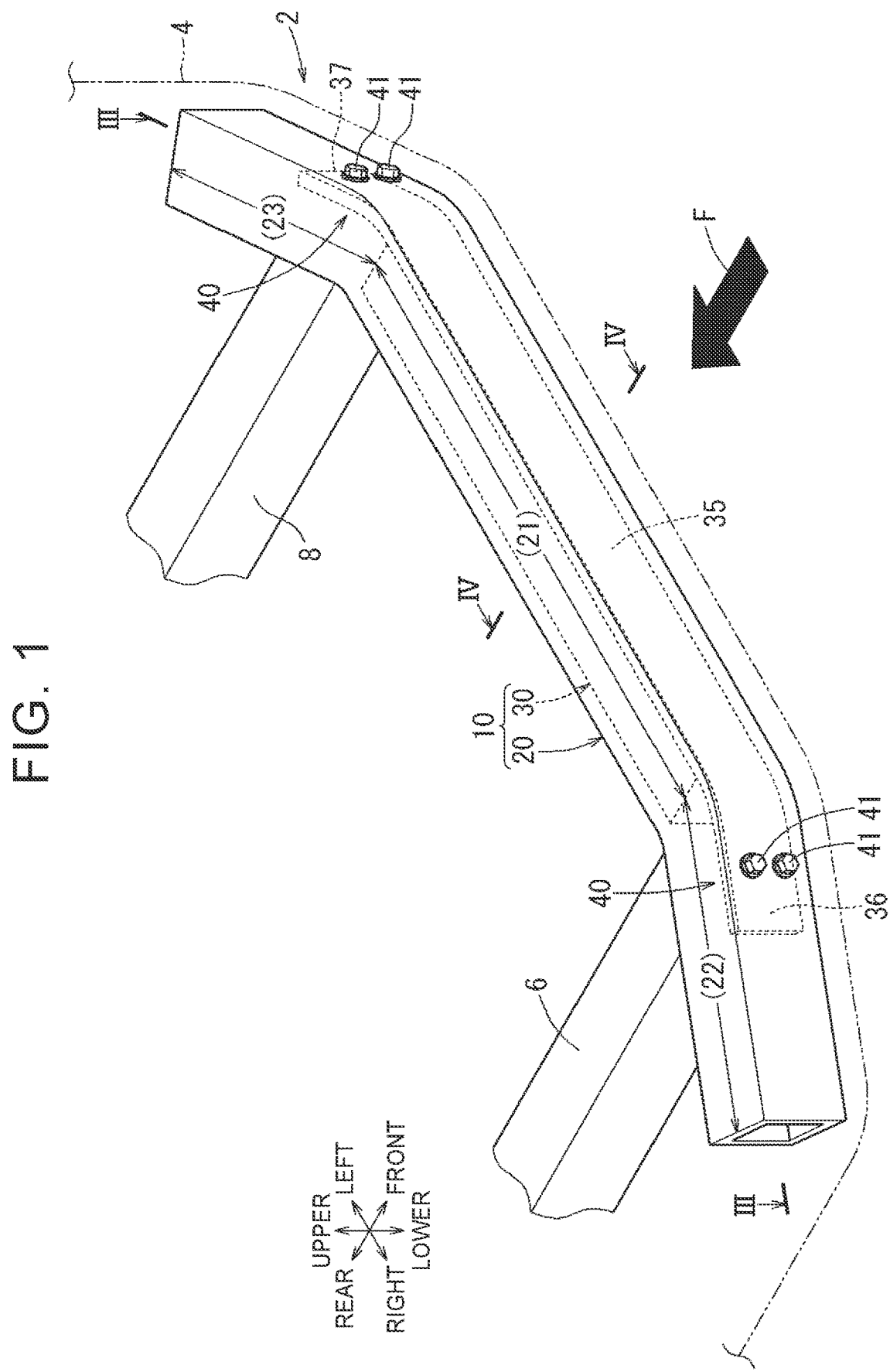
FIG. 1 is a schematic see-through perspective view of a front portion of a vehicle illustrating a shock absorbing member.

Hereinafter, a mode for carrying out the disclosure will be described with reference to FIGS. 1 to 9. In FIG. 1, for convenience, arrows indicating the front-rear directions, the right-left directions, and the upper-lower directions of a vehicle are illustrated as appropriate. In FIGS. 2 to 9, for convenience, arrows indicating these front-rear, right-left, and upper-lower directions are illustrated as appropriate assuming a state in which a shock absorbing member and its configuration are attached to the vehicle.

A vehicle 2 illustrated in FIG. 1 includes a vehicle body 4 forming the external shape of the vehicle 2, a pair of right and left side members 8, 6 extending in the front-rear direction at a lower portion of the vehicle body 4, and a shock absorbing member 10. The shock absorbing member 10 is a member that functions as a bumper reinforcement. The shock absorbing member 10 is supported by the right and left side members 8, 6 and mounted on the front side of the vehicle body 4. An impact load F that is applied from the front at the time of a vehicle collision or the like is absorbed by the shock absorbing member 10, but, in this event, the situation where the shock absorbing member 10 is subjected to local folding so as to be largely bent at an unintended portion should be avoided as much as possible. In view of this, the shock absorbing member 10 of this embodiment is configured such that an inner member 30 is held in an outer member 20 forming the external shape of the shock absorbing member 10 so as to absorb the applied impact load F by the outer member 20 and the inner member 30. In the shock absorbing member 10 of this type, it is desirable to hold the inner member 30 to the outer member 20 while ensuring good performance, and in particular, it is desirable to be able to maintain excellent positioning performance for the inner member 30. Therefore, in this embodiment, the inner member 30 is held to the outer member 20 while ensuring good performance by a later-described configuration (holding structures 40, etc.). The respective configurations will be described in detail below.

Shock Absorbing Member (Outer Member)

Figure 3:
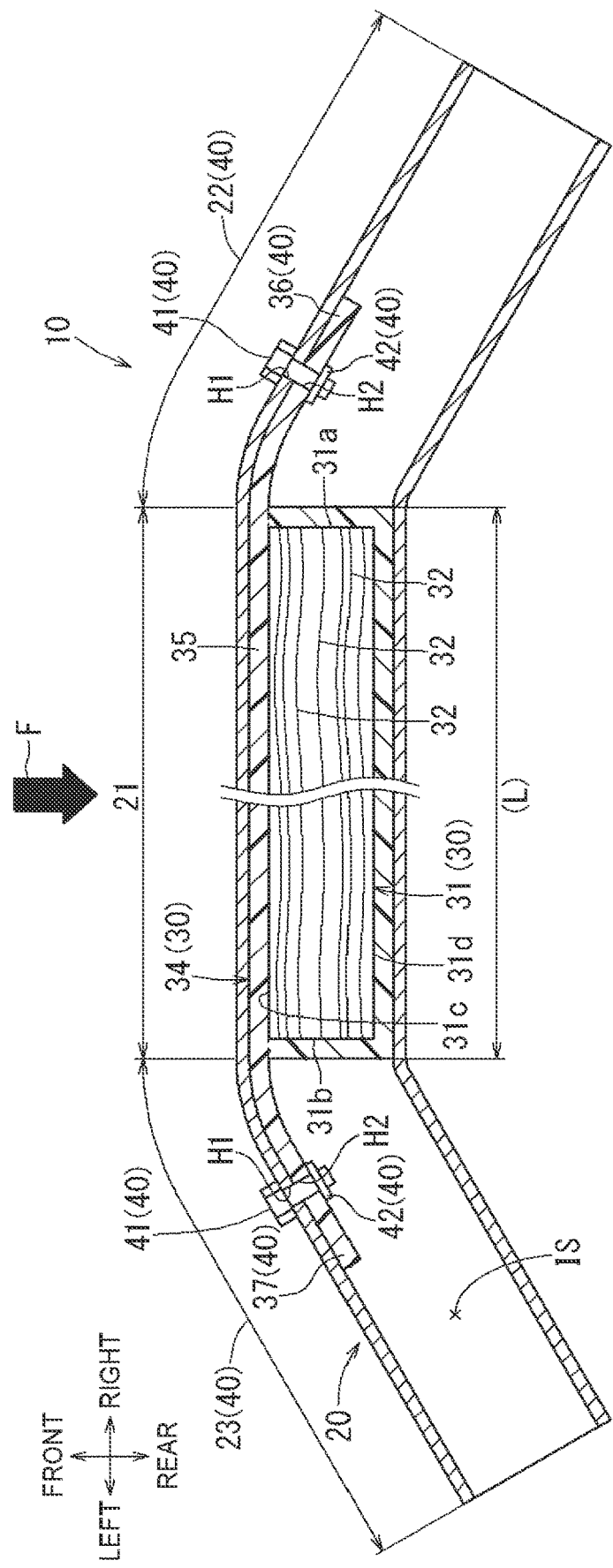
FIG. 3 is a schematic sectional view of the shock absorbing member taken along the line III-III in FIG. 1.

The shock absorbing member 10 illustrated in FIG. 1 is a hollow member that is elongated in the right-left direction (vehicle-width direction), and includes the outer member 20, the inner member 30, and the holding structures 40. As illustrated in FIGS. 1 and 3, the outer member 20 forming the external shape of the shock absorbing member 10 is a hollow columnar member that is made of a metal and is elongated in the right-left direction, and has an external shape that can be used as a bumper reinforcement. As a material of the outer member 20, it is possible to use various types of metals or alloys that are plastically deformable, and the same type of metal as the vehicle body 4 (steel or the like) or a different type of metal may be used.

The outer member 20 illustrated in FIGS. 1 and 3 is generally curved as a bow in plan view and has a general portion 21, a right bent-deformed portion 22, and a left bent-deformed portion 23. The general portion 21 is a square prism portion extending generally straight in the right-left direction (predetermined direction) and allows a later-described wood member 31 of the inner member 30 to be disposed therein. The general portion 21 has an appropriate length and is provided in the middle of the outer member 20 in the right-left direction. The general portion 21 is a portion to which the impact load F is conceived to be applied. The right bent-deformed portion 22 is a portion that is bent and deformed rearward from the right end side of the general portion 21, and is curved gradually rearward as going rightward. The left bent-deformed portion 23 is a portion that is bent and deformed rearward from the left end side of the general portion 21, and is curved gradually rearward as going leftward. In this embodiment, through a later-described bending process, the right bent-deformed portion 22 and the left bent-deformed portion 23 are provided generally laterally symmetrical to each other. The bent-deformed portions 22, 23 each form a part (bent structure) of the later-described holding structure 40, and a part of a bracket 34 of the inner member 30 is positioned and held to each of the bent-deformed portions 22, 23.

Inner Member (Wood Member)

Figure 2:
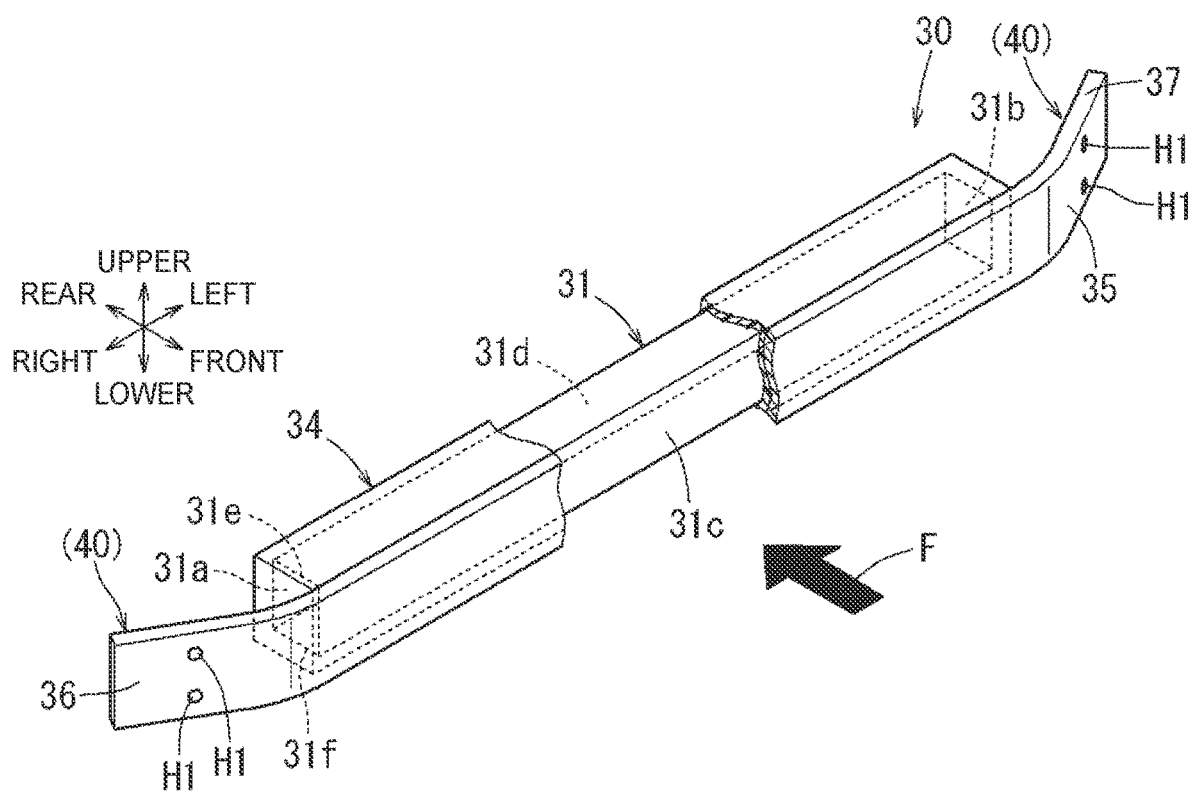
FIG. 2 is a perspective view of an inner member of the shock absorbing member with a bracket partially broken away.
Figure 4:
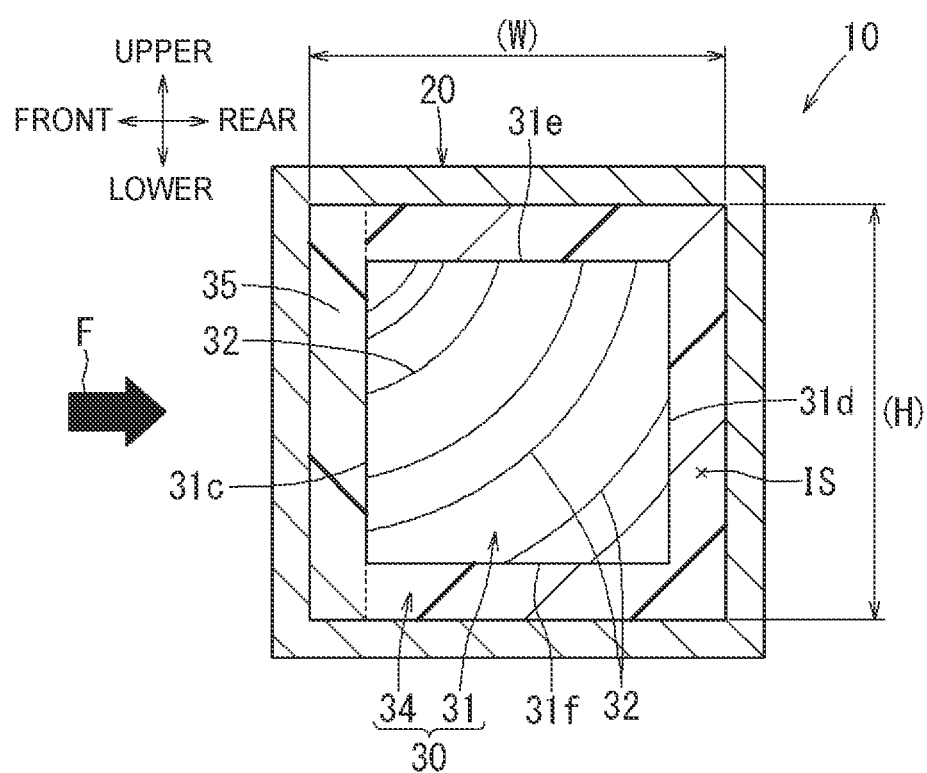
FIG. 4 is a schematic sectional view of the shock absorbing member taken along the line IV-IV in FIG. 1.

As illustrated in FIGS. 2 to 4, the inner member 30 disposed in the outer member 20 is formed elongated in the right-left direction and is formed by integrating the wood member 31 and the bracket 34 (details described later). The wood member 31 is a member serving as a core portion of the inner member 30 and can absorb the impact load F, applied at the time of the vehicle collision, by being broken under pressure (crushed). The wood member 31 is formed in a square prism shape that can be housed in the general portion 21 of the outer member 20. The wood member 31 has a right end portion 31a, a left end portion 31b, and four side surface portions (front side surface portion 31c, rear side surface portion 31d, upper side surface portion 31e, lower side surface portion 31f). In the state where the inner member 30 is disposed in the outer member 20, the right end portion 31a is disposed at a position facing the right bent-deformed portion 22, and the left end portion 31b is disposed at a position facing the left bent-deformed portion 23. The side surface portions 31c to 31f are elongated outer surface portions extending in the right-left direction between the right end portion 31a and the left end portion 31b. The upper side surface portion 31e and the lower side surface portion 31f are disposed opposite to each other in the upper-lower direction, and the front side surface portion 31c and the rear side surface portion 31d are disposed opposite to each other in the front-rear direction. The front side surface portion 31c forming the front outer surface of the wood member 31 is a portion corresponding to an outer surface portion of a wood member, extending in a longitudinal direction of the wood member, of the disclosure and can receive the impact load F applied to the outer member 20.

The wood member 31 illustrated in FIGS. 2 to 4 can be obtained from a needle-leaved tree such as a Japanese cedar, a Japanese cypress, or a pine tree, or a broad-leaved tree such as a zelkova tree or a Japanese beech. In particular, it is desirable to obtain the wood member 31 from the needle-leaved tree having growth rings 32 that are relatively clear (for convenience, symbols 32 are assigned to only part of the growth rings in FIG. 3). The wood member 31 may be disposed such that the axial direction of the growth rings 32 illustrated in FIG. 3 extends along the extending direction of the general portion 21 or extends perpendicular to the extending direction of the general portion 21. For example, in this embodiment, the wood member 31 is disposed with the axial direction of the growth rings 32 extending along the extending direction of the general portion 21 (the right-left direction) so that the processing is relatively easy. Alternatively, giving priority to the shock absorption performance, the axial direction of the growth rings 32 of the wood member 31 can be aligned with the direction perpendicular to the extending direction of the general portion 21 (the front-rear direction) so as to coincide with the application direction of the impact load F.

The density of the wood member 31 can be set taking into account the shock absorption performance, the lightness, or the like, and typically can be set in a range from 0.2 g/cm$^3$ to 1.0 g/cm$^3$. The moisture content of the wood member 31 is not particularly limited as long as the wood member 31 has desired shock absorption performance. The moisture content of the wood member 31 can be adjusted typically in a range from 5% to 16% and is preferably set to about 10% and more preferably set to about 8%. As a method of making the moisture content of the wood member 31 about 8% to 10%, there can be cited a method of placing the wood member 31 in a room at a temperature of about 30° C. and a humidity of about 90% for a predetermined time. As a method of measuring the moisture content of the wood member 31, there can be cited a method of measuring the moisture content from the difference between the weight of the wood member 31 dried by the method described above and the weight of the wood member 31 before the drying.

Bracket

The bracket 34 illustrated in FIGS. 2 to 4 is a member made of a solid resin and forming the external shape of the inner member 30 and has a mounting portion 35 (a pair of right and left protruding portions 36, 37) (in FIGS. 3 and 4, for convenience, hatching of a portion, corresponding to the mounting portion, of the bracket differs from hatching of the other portion of the bracket). The bracket 34 is integrated with the outer side of the wood member 31 using a method such as insert molding, adhesion, or fusion bonding, and in this embodiment, the bracket 34 is formed in a generally square prism shape and integrated to envelop the wood member 31. That is, the bracket 34 is provided to cover the end portions 31a, 31b and the side surface portions 31c to 31f of the wood member 31, and the mounting portion 35 (details described later) forming the front side of the bracket 34 is provided to cover the front side surface portion 31c of the wood member 31. By covering around the wood member 31 with the bracket 34 in this way, it is possible to avoid degradation of the wood member 31 due to light, water, or the like (external stimulus) as much as possible, thereby contributing to improvement in durability.

As illustrated in FIGS. 2 to 4, the mounting portion 35 forming the front side of the bracket 34 is elongated in the right-left direction along the front side surface portion 31c. The mounting portion 35 is a portion that corresponds to a bracket portion integrated with the outer surface portion of the disclosure and that is held (mounted) to the outer member 20. The mounting portion 35 has a right-left length greater than that of the front side surface portion 31c and is provided with the right protruding portion 36 and the left protruding portion 37. As illustrated in FIG. 3, the right protruding portion 36 is a portion, protruding rightward from the right end portion 31a of the wood member 31, of the mounting portion 35, and is bent and deformed in the same direction as the right bent-deformed portion 22 of the outer member 20 so as to be in close contact with the right bent-deformed portion 22 of the outer member 20. The left protruding portion 37 is a portion, protruding leftward from the left end portion 31b of the wood member 31, of the mounting portion 35, and is bent and deformed in the same direction as the left bent-deformed portion 23 of the outer member 20 so as to be in close contact with the left bent-deformed portion 23 of the outer member 20. The right protruding portion 36 and the left protruding portion 37 are provided generally laterally symmetrical to each other to each form a part (bent structure) of the later-described holding structure 40, and are portions where later-described fastening structures of the holding structures 40 are respectively provided. In this embodiment, since the length of the mounting portion 35 for providing the holding structures 40 is ensured, a configuration is provided that contributes to achieving excellent positioning performance for the inner member 30.

The length L, the height H, and the width W of the inner member 30 can be defined by the external dimensions of the bracket 34 illustrated in FIGS. 3 and 4. For example, the right-left dimension (length L) of a portion, where the wood member 31 is disposed, of the inner member 30 illustrated in FIG. 3 is defined by the right-left dimension of the bracket 34 excluding the mounting portion 35. The length L of the portion of the inner member 30 is set to a dimension that can be accommodated in the general portion 21 of the outer member 20, and in this embodiment, is set to be approximately equal to that of the general portion 21.

The upper-lower dimension (height H) of the inner member 30 illustrated in FIG. 4 is defined by the upper-lower dimension of the bracket 34, and the front-rear dimension (width W) of the inner member 30 illustrated in FIG. 4 is defined by the front-rear dimension of the bracket 34. The height H and the width W of the inner member 30 can be set as appropriate according to an internal space IS of the outer member 20. For example, in this embodiment, the height H and the width W of the inner member 30 are adjusted so that the inner member 30 is housed in the outer member 20 in a state with substantially no gap therebetween. By disposing the inner member 30 in the outer member 20 in this way, the shock absorbing member 10 is in a substantially solid state so that it is possible to maintain excellent shock absorption performance. Note that "a state with substantially no gap therebetween" means to allow a slight gap (upper-lower or front-rear gap) between the outer surface of the inner member 30 and the inner surface of the outer member 20 in order to enable insertion (pushing) of the inner member 30 into the outer member 20. That is, although the external shape of the inner member 30 is formed to imitate the internal space IS in a range that allows its insertion into the outer member 20, there are cases where it is difficult to provide a state with no gap at all, and it is also unavoidable that a slight gap is formed due to design error. Even when a slight gap is formed between the outer member 20 and the inner member 30 due to relation to insertion work or design error, since the gap is not intentional, it can be regarded as "a state with substantially no gap therebetween".

As the solid resin forming the bracket 34, it is possible to use various types of thermoplastic resins or thermosetting resins, and it is desirable to use a resin having appropriate flexibility. As this type of thermoplastic resin, there can be cited a polyolefin resin such as polypropylene or polyethylene, a polycarbonate resin, a polyester resin such as polyethylene terephthalate, polybutylene terephthalate, poly(ethylene-2,6-naphthalate), or nylon (polyamide), a propylene-ethylene copolymer, a polystyrene resin, a copolymer of an aromatic vinyl monomer and (meth)acrylic acid alkyl ester having a lower alkyl group, a terephthalic acid-ethylene glycol-cyclohexanedimethanol copolymer, or a (meth)acrylic resin such as polymethyl methacrylate. As this type of thermosetting resin, there can be cited a phenolic resin, an epoxy resin, a melamine resin, or a urea resin. Thermoplastic resins or thermosetting resins can be used alone or can be used in combination of two or more of them.

Holding of Inner Member to Outer Member

The shock absorbing member 10 illustrated in FIGS. 1 to 3 is mounted on the front side of the vehicle body 4 in the state where the inner member 30 is held in the outer member 20. The shock absorbing member 10 is set in a state where an impact load F that is applied to the outer member 20 at the time of a vehicle collision can be absorbed by both the outer member 20 and the inner member 30. In the shock absorbing member 10 of this type, it is desirable to be able to hold the inner member 30 to the outer member 20 while ensuring good performance, and in particular, it is desirable to be able to hold the inner member 30 to the outer member 20 while maintaining excellent positioning performance. Therefore, in this embodiment, the inner member 30 is formed by integrating the wood member 31 and the bracket 34 made of the solid resin. Further, the shock absorbing member 10 is provided with the later-described holding structures 40 that position and hold the bracket 34 to the outer member 20.

Holding Structure

The holding structures 40 illustrated in FIG. 3 are each a structure that positions and holds the bracket 34 to the outer member 20. As the holding structure 40, it is possible to employ the bent structure of the outer member 20 and the inner member 30 or a fixing structure that fixes the resin and the metal to each other. As this type of fixing structure, it is possible to employ various structures such as a fastening structure, a caulking structure, or an adhesive structure such as adhesion or fusion bonding. In the holding structure 40 of this embodiment, as will be described later, the bent structure of the outer member 20 and the inner member 30 and the fastening structure using bolt-like fasteners 41 and nuts 42 are employed in combination.

The bent structures (22 and 36, 23 and 37) as the holding structures 40 illustrated in FIG. 3 are respectively provided on the right side and the left side of the general portion 21 of the shock absorbing member 10. That is, in this embodiment, in the state where the inner member 30 is disposed in the outer member 20, the wood member 31 and the bracket 34 enveloping the wood member 31 are disposed in the general portion 21. The right bent structure is composed of the right bent-deformed portion 22 and the right protruding portion 36 protruding rightward from the wood member 31, and the portions 22, 36 are bent and deformed in the same direction while being in close contact with each other. The left bent structure is composed of the left bent-deformed portion 23 and the left protruding portion 37 protruding leftward from the wood member 31, and the portions 23, 37 are bent and deformed in the same direction while being in close contact with each other. In this way, in this embodiment, the general portion 21 is in a state of being sandwiched between the bent structures as the holding structures 40 that are provided on the right side and the left side of the general portion 21. In each of the bent structures as the holding structures 40, the protruding portion 36 (37) is in close contact with the bent-deformed portion 22 (23) and is moderately positioned and held to the bent-deformed portion 22 (23). Therefore, even when the wood member 31 and the portion, enveloping the wood member 31, of the bracket 34 attempts to move relative to the general portion 21 in the right-left direction, such movement in the right-left direction is prevented more reliably by the right and left bent structures (22 and 36, 23 and 37).

Further, in this embodiment, the protruding portion 36 (37) is positioned and held to the bent-deformed portion 22 (23) by the fastening structure as the holding structure 40 illustrated in FIG. 3. In the shock absorbing member 10, a fastening hole H1 provided in the right bent-deformed portion 22 and a fastening hole H2 provided in the right protruding portion 36 are arranged coaxially. The fastener 41 forming the fastening structure is inserted through the fastening holes H1, H2 and held by the nut 42. As illustrated in FIG. 1, the fastening structure (the fastener 41) as the holding structure 40 is provided at upper and lower portions of the right bent-deformed portion 22 and the right protruding portion 36 so that the right protruding portion 36 can be held to the right bent-deformed portion 22 in a well-balanced manner in the upper-lower direction. Referring to FIGS. 1 and 3, fastening holes H1, H2 are coaxially formed also in the left bent-deformed portion 23 and the left protruding portion 37, respectively, and the fastener 41 forming the fastening structure is inserted through the fastening holes H1, H2 and held by the nut 42. In this way, with the holding structure 40 of this embodiment, the protruding portion 36 (37) of the bracket 34 is positioned and held to the corresponding bent-deformed portion 22 (23) by the bent structure and the fastening structure so that a configuration is provided that contributes to achieving excellent positioning performance for the inner member 30.

Manufacturing Method for Shock Absorbing Member

Figure 5:
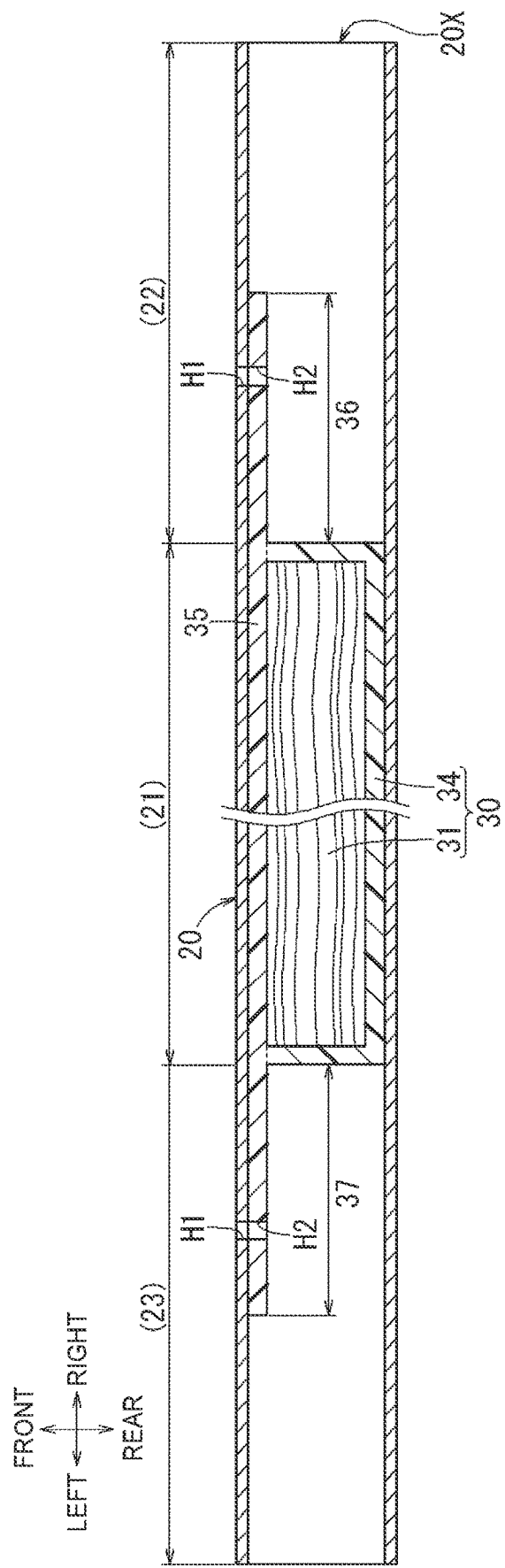
FIG. 5 is a schematic sectional view of a base member and the inner member.

The shock absorbing member 10 illustrated in FIGS. 1 to 3 can be manufactured through a later-described manufacturing method (bending process). In the manufacturing method for the shock absorbing member 10, as illustrated in FIG. 5, the inner member 30 formed by integrating the wood member 31 and the bracket 34 is prepared. The protruding portions 36, 37 of the inner member 30 are respectively provided with the fastening holes H2 at appropriate portions thereof. A base member 20X formed generally straight is prepared. The base member 20X is provided with the fastening holes H1 at appropriate portions thereof. A forming method for the base member 20X is not particularly limited, and typically the base member 20X can be formed using a single metal plate or a plurality of metal plates. For example, the base member 20X can be formed by preparing two metal plates each bent and deformed to a generally ]-shape and then joining the two metal plates by welding, fastening, or the like to form a hollow columnar shape. Alternatively, the base member 20X can be formed by bending and deforming a single metal plate to a hollow columnar shape and then fixing it by welding or the like.

Then, as illustrated in FIG. 5, the inner member 30 is inserted (pushed) into the base member 20X so as to be disposed at an appropriate portion of the base member 20X. That is, the wood member 31 and the portion, enveloping the wood member 31, of the bracket 34 are disposed at a portion to be a general portion (21) of the base member 20X, and the protruding portions 36, 37 of the bracket 34 are disposed at portions to be bent-deformed portions (22), (23) of the base member 20X. Then, referring to FIG. 6, the outer member 20 is formed through a bending process in which at least a part of the base member 20X is bent and deformed along with the bracket 34 to form a bent-deformed portion. In this event, in this embodiment, the right side and the left side of the base member 20X are bent and deformed, thereby forming the general portion 21, the right bent-deformed portion 22, and the left bent-deformed portion 23 of the outer member 20. In this bending process, the right protruding portion 36 of the bracket 34 is bent and deformed along with and in the same direction as the right bent-deformed portion 22, and the left protruding portion 37 of the bracket 34 is bent and deformed along with and in the same direction as the left bent-deformed portion 23. The right protruding portion 36 and the left protruding portion 37 correspond to a bracket portion bent and deformed along with a bent-deformed portion of the disclosure. In this embodiment, since the protruding portions 36, 37 are made to protrude from the wood member 31 in the appropriate directions, it is possible to bend and deform the protruding portions 36, 37 smoothly with as little influence from the wood member 31 as possible. Further, by avoiding as much as possible the occurrence of unintended stress on the wood member 31 that is otherwise caused by bending and deforming only the protruding portions 36, 37, a configuration is provided that contributes to maintaining excellent shock absorption performance of the inner member 30.

Figure 6:
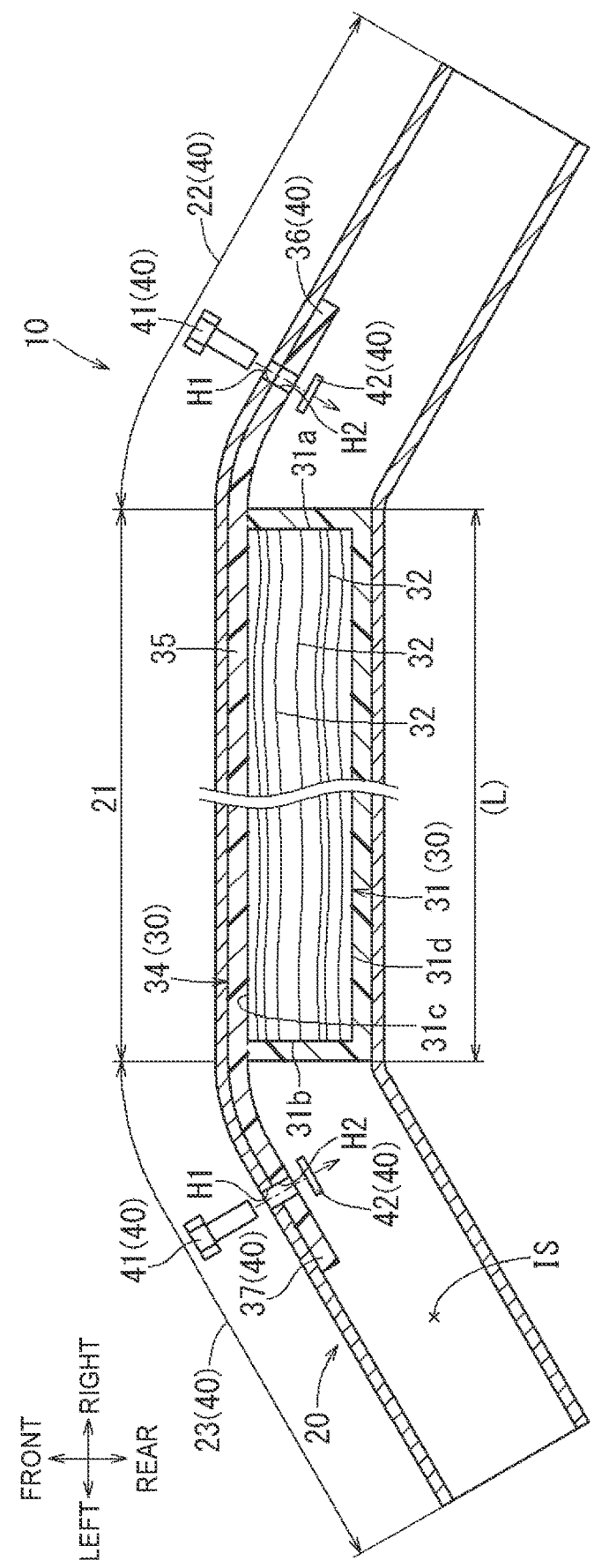
FIG. 6 is a schematic sectional view of an outer member and the inner member after a bending process.
Figure 7:
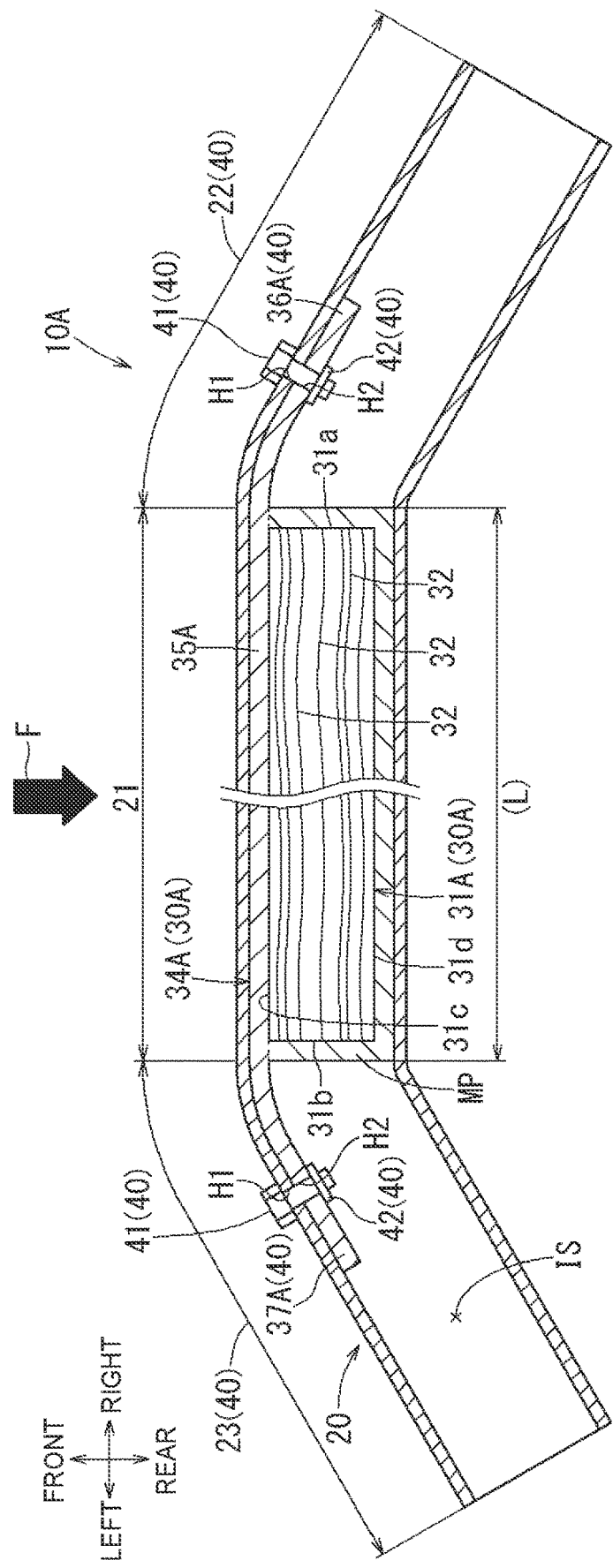
FIG. 7 is a schematic sectional view of a shock absorbing member of another example.
Figure 8:
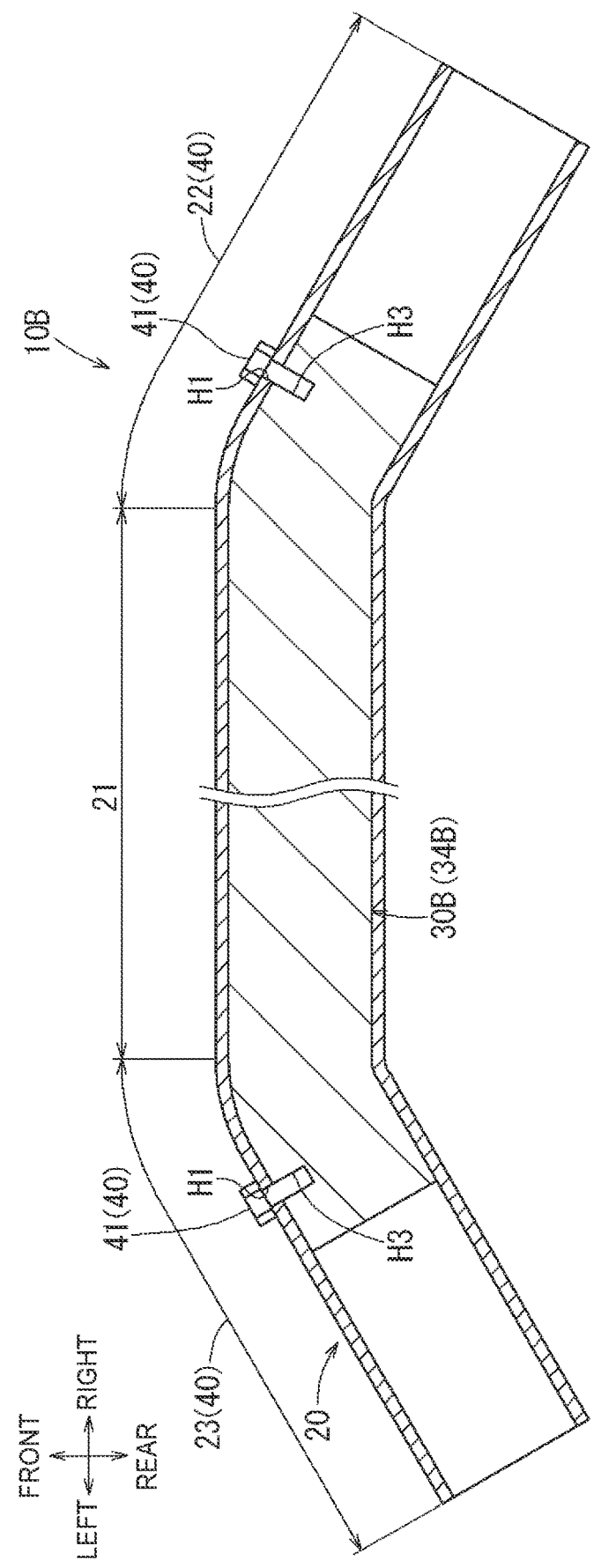
FIG. 8 is a schematic sectional view of a shock absorbing member of a first modification.

In this way, in this embodiment, by providing the bent structure as the holding structure 40, the protruding portion 36 (37) is in close contact with the bent-deformed portion 22 (23) and is moderately positioned and held to the bent-deformed portion 22 (23). Further, by providing the bent structures (22 and 36, 23 and 37) respectively on both end sides of the general portion 21 in the right-left direction (longitudinal direction), it is possible to more reliably prevent the movement of the inner member 30 relative to the outer member 20 so that a configuration is provided that contributes to improvement in positioning performance and so on. Then, after the bending process, the protruding portion 36 (37) disposed in close contact with the bent-deformed portion 22 (23) of the outer member 20 as illustrated in FIG. 6 is positioned and held to the bent-deformed portion 22 (23) via the fastening structure as the holding structure 40. That is, the fastener 41 forming the holding structure 40 (fastening structure) is inserted through the fastening hole H1 of the right bent-deformed portion 22 and the fastening hole H2 of the right protruding portion 36 and held by the nut 42. Likewise, the fastener 41 forming the holding structure 40 (fastening structure) is inserted through the fastening hole H1 of the left bent-deformed portion 23 and the fastening hole H2 of the left protruding portion 37 and held by the nut 42. In this way, by further providing the fastening structure to the shock absorbing member 10 after the bending process, it is possible to more reliably position and hold the protruding portion 36 (37) to the bent-deformed portion 22 (23).

Use Example of Shock Absorbing Member

Referring to FIGS. 1 to 3, the shock absorbing member 10 is mounted as a bumper reinforcement on the front side of the vehicle body 4. The shock absorbing member 10 in this state is exposed to external stimulus such as light or water, and therefore, there is a possibility that the wood member 31 excessively degrades due to the external stimulus. Therefore, in this embodiment, by enveloping the wood member 31 with the bracket 34, a configuration is provided that can avoid degradation of the wood member 31 due to the external stimulus as much as possible, thereby contributing to maintaining excellent durability. Further, in this embodiment, a configuration is provided that contributes to weight reduction of the vehicle 2 by forming the bracket 34 of the relatively light resin.

At the time of a vehicle collision, an impact load F applied to the vehicle 2 is absorbed by the shock absorbing member 10 as the bumper reinforcement. For example, in this embodiment, a case is supposed in which the vehicle 2 has collided with a columnar member (not illustrated) rising from the ground. Generally, the diameter of the columnar member is smaller than the right-left dimension of the general portion 21. An impact load F from the columnar member is applied to the shock absorbing member 10 on the general portion 21 of the outer member 20, and this impact load F can be absorbed by moderate compression deformation of the general portion 21 and crushing of the wood member 31 in the inner member 30. In this event, the large impact load F is locally applied to the general portion 21, but this applied impact load F is absorbed while being dispersed in the right-left direction by the wood member 31 inside the general portion 21. In this way, in this embodiment, the impact load F is absorbed while being dispersed by the outer member 20 and the inner member 30 so as to avoid local folding of the general portion 21 as much as possible, and consequently, it is possible to avoid as much as possible the situation where the shock absorbing member 10 is largely bent at an unintended portion.

As described above, in the inner member 30 of the shock absorbing member 10 of this embodiment, the bracket 34 harder than a foamed resin and excellent in durability is integrated with the wood member 31. Since the bracket 34 is positioned and held to the outer member 20 by the holding structures 40, it is possible to hold the inner member 30 to the outer member 20 while maintaining excellent positioning performance. In this embodiment, by providing the bent-deformed portions 22, 23 to the outer member 20, it is possible to prevent the movement of the inner member 30 relative to the general portion 21 as much as possible. Further, since the bracket 34 is positioned and held in the state where the bracket 34 is in close contact with the bent-deformed portions 22, 23 by the holding structures 40, a configuration is provided that contributes to achieving excellent positioning performance for the inner member 30. In this embodiment, since the dimension of the bracket 34 (the mounting portion 35) for providing the holding structures 40 is ensured, a configuration is provided that further contributes to achieving excellent positioning performance for the inner member 30. In this embodiment, degradation of the wood member 31 due to external stimulus can be prevented as much as possible by the bracket 34 disposed around the wood member 31. In this embodiment, a configuration is provided that contributes to weight reduction of the shock absorbing member 10 by forming the bracket 34 of the solid resin that is lighter than a metal. Therefore, according to this embodiment, it is possible to hold the inner member 30 to the outer member 20 while ensuring good performance.

In the manufacturing method for the shock absorbing member 10 of this embodiment, the bent-deformed portions 22, 23 are provided to the outer member 20 through the bending process so that it is possible to prevent the movement of the inner member 30 relative to the outer member 20 as much as possible. Since the bracket 34 is bent and deformed along with the bent-deformed portions 22, 23 so as to be in close contact with the bent-deformed portions 22, 23, it is possible to hold the inner member 30 to the outer member 20 while maintaining excellent positioning performance. In this embodiment, the predetermined bracket portions (the protruding portions 36, 37) are bent and deformed along with the bent-deformed portions 22, 23 so as to be in close contact with the bent-deformed portions 22, 23 and can be positioned and held more reliably by the holding structures 40 (fastening structures) that are provided after the bending process. In this embodiment, the predetermined protruding bracket portions (the protruding portions 36, 37) can be bent and deformed smoothly with as little influence from the wood member 31 as possible and thus can be positioned and held to the outer member 20 more appropriately. In this embodiment, the movement of the inner member 30 relative to the general portion 21 can be prevented more reliably by the bent-deformed portions 22, 23 that are respectively provided at both ends of the general portion 21.

Another Example of Inner Member

The inner member may have various configurations in addition to the configuration described above. For example, in a shock absorbing member 10A of another example illustrated in FIG. 7, an inner member 30A is formed by integrating a wood member 31A and a bracket 34A. In this example, the wood member 31A is the same as the wood member 31 of the embodiment, but the bracket 34A differs from the bracket 34 of the embodiment in that the bracket 34A is a member made of a metal that is harder than a foamed resin and excellent in durability. The bracket 34A has generally the same external shape as the bracket 34 of the embodiment and has a mounting portion 35A and right and left protruding portions 36A, 37A. As a material of the bracket 34A of this type, it is possible to use various types of metals that are plastically deformable along with the outer member 20, and it is possible to use a metal of the type that is the same as or different from the outer member 20. As a metal, there can be cited, in addition to a ferrous metal such as steel, a metal such as an aluminum alloy metal, a magnesium alloy metal, or a titanium alloy metal. The thickness of the metal can be set so as to allow crushing of the wood member 31A.

A forming method for the bracket 34A is not particularly limited. For example, the bracket 34A can be formed by fixing a metal plate forming the mounting portion 35A to another metal plate MP having a ]-shape in section and forming the other portion, by welding or the like. The wood member 31A can be integrated with the inner surface of the bracket 34A using a method such as fastening, adhesion, or fusion bonding. For example, by disposing non-illustrated bolt-like fasteners so as to pass through both the bracket 34A and the wood member 31A in the front-rear direction, it is possible to integrate the bracket 34A and the wood member 31A more firmly. In this case, it is desirable that the non-illustrated bolt-like fasteners be respectively disposed on the right-left sides of a portion to which an impact load F is conceived to be applied.

Also in the shock absorbing member 10A of this example, the holding structures 40 that position and hold the protruding portions 36A, 37A of the bracket 34A to the outer member 20 are provided. As the holding structure 40 of this example, it is possible to employ a bent structure of the outer member 20 and the inner member 30A or a fixing structure that fixes the metals to each other. In the holding structure 40 of this example, like in the embodiment, the bent structure and a fastening structure as the fixing structure are employed in combination. As other fixing structures, it is possible to employ various structures such as a welding structure, a brazing structure such as soldering, a caulking structure, or an adhesive structure. In this way, also in this example, since the protruding portions 36A, 37A are positioned and held to the outer member 20 by the holding structures 40, it is possible to hold the inner member 30A to the outer member 20 while maintaining excellent positioning performance.

First Modification

The shock absorbing member may have various configurations in addition to the configuration described above. For example, a shock absorbing member 10B of a first modification illustrated in FIG. 8 includes the outer member 20 and an inner member 30B, and the external shape of the inner member 30B differs from the embodiment. That is, a bracket 34B forming the external shape of the inner member 30B is formed in a generally square prism shape so as to envelop a wood member, and portions corresponding to protruding portions are omitted (for convenience, illustration of the wood member is omitted in FIG. 8). The right side and the left side of the bracket 34B are bent and deformed along with the corresponding bent-deformed portions 22, 23 so that bent structures as the holding structures 40 are formed. Further, the right side and the left side of the bracket 34B are positioned and held to the corresponding bent-deformed portions 22, 23 by fastening structures as the holding structures 40. The tips of the fasteners 41 forming the holding structures 40 pass through the fastening holes H1 of the bent-deformed portions 22, 23 and are threaded into screw holes H3 provided in the bracket 34B. In this way, the inner member 30B of this modification is configured such that the bracket 34B is elongated in the right-left direction while enveloping the wood member, and therefore, it is possible to avoid local folding of the shock absorbing member 10B over a wide range as much as possible.

In the first modification, the wood member is disposed in the bent-deformed portions 22, 23 with the right side and the left side of the wood member being slightly compressively deformed. However, it is possible to dispose only the bracket 34B. In this modification, the fasteners 41 forming the holding structures 40 are disposed on the front side of the outer member 20. Differently from this, the fasteners 41 can be disposed on the rear side of the outer member 20, or can be disposed to pass through the outer member 20 and the inner member 30B in the front-rear direction. That is, the bracket 34B of this modification is configured such that both the front side and the rear side thereof are bent and deformed along with the outer member 20, and therefore, the arrangement position of the fixing structure as the holding structure 40 can be set relatively freely. Therefore, in this modification, the degree of freedom for the arrangement position of the holding structure 40 is increased so that the design change or the like of the shock absorbing member 10B according to the vehicle type is facilitated.

Second Modification

Figure 9:
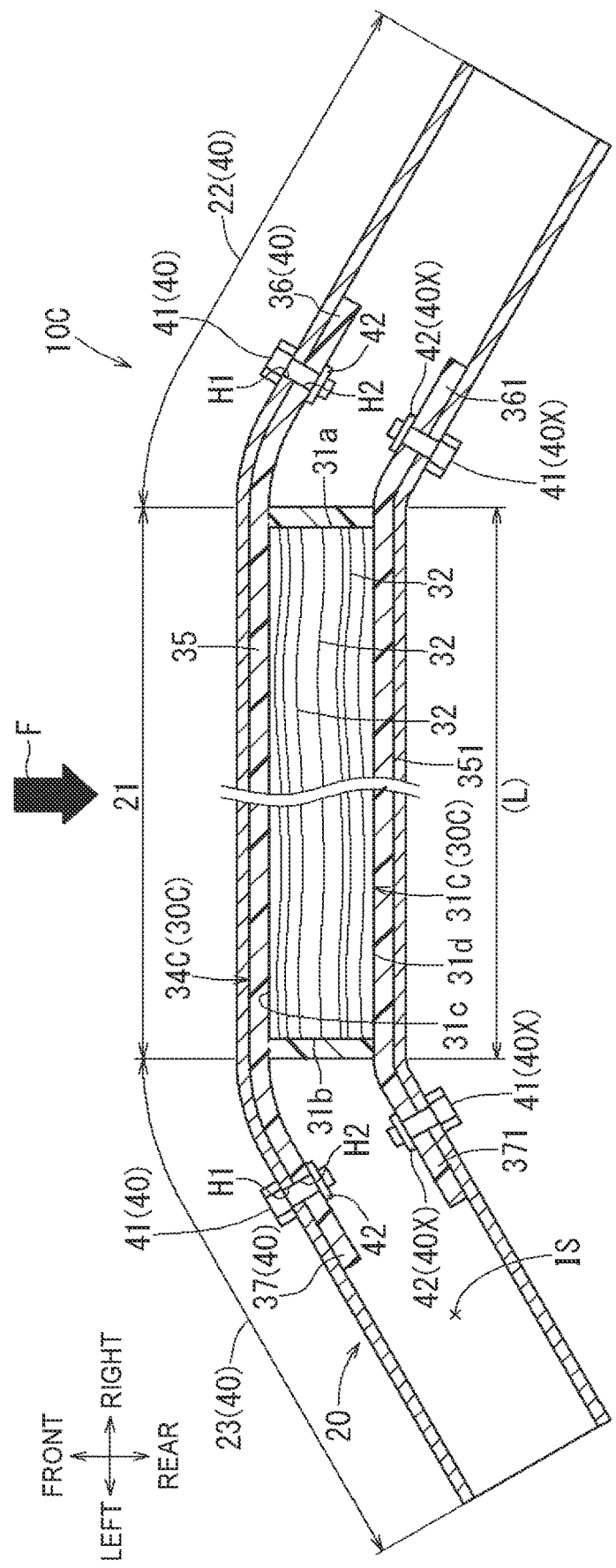
FIG. 9 is a schematic sectional view of a shock absorbing member of a second modification.

A shock absorbing member 10C of a second modification illustrated in FIG. 9 includes the outer member 20 and an inner member 30C, and the configuration of the inner member 30C differs from the embodiment. That is, in this modification, while a wood member 31C that is the same as the embodiment is used, a bracket 34C is provided with the front mounting portion 35 and a rear mounting portion 351. The front mounting portion 35 is a portion of the same configuration as the mounting portion of the embodiment and is provided with the right protruding portion 36 and the left protruding portion 37. In the front mounting portion 35, the protruding portion 36 (37) can be positioned and held to the front inner surface of the corresponding bent-deformed portion 22 (23) by the bent structure and the fastening structure (the front holding structure 40) like in the embodiment.

The rear mounting portion 351 is a portion forming the rear side of the bracket 34C and covers the rear side surface portion 31d of the wood member 31C. The rear mounting portion 351 has a right-left length greater than that of the rear side surface portion 31d and is provided with a right-rear protruding portion 361 and a left-rear protruding portion 371 like the front mounting portion 35. In the rear mounting portion 351, the protruding portion 361 (371) can be positioned and held to the rear inner surface of the corresponding bent-deformed portion 22 (23) by a fastening structure as a rear holding structure 40X. That is, the right-rear protruding portion 361 is bent and deformed in the same direction as the right bent-deformed portion 22 so as to be in close contact with the rear inner surface of the right bent-deformed portion 22. In this state, a fastener 41 forming the rear holding structure 40X is inserted through fastening holes (symbols omitted) of the right bent-deformed portion 22 and the right-rear protruding portion 361 and held by a nut 42. Likewise, the left-rear protruding portion 371 is bent and deformed in the same direction as the left bent-deformed portion 23 so as to be in close contact with the rear inner surface of the left bent-deformed portion 23. In this state, a fastener 41 forming the rear holding structure 40X is inserted through fastening holes (symbols omitted) of the left bent-deformed portion 23 and the left-rear protruding portion 371 and held by a nut 42. In this way, in this modification, since the right and left sides of the bracket 34C can be positioned and held to the outer member 20 via the holding structures 40, 40X in a well-balanced manner in the front-rear direction, a configuration is provided that further contributes to achieving excellent positioning performance for the inner member 30C.

The shock absorbing member 10 and the like described above are not limited to the above-described mode and can take various other modes. In the above-described mode, the configuration (shape, dimensions, number of arrangement, arrangement position, etc.) of the outer member 20 is given by way of example, which is not intended to limit the configuration of the outer member in any aspect. For example, in the outer member, a single or a plurality of bent-deformed portions can be provided, and the forming positions of the general portion and the bent-deformed portions can be set as appropriate according to a use of the shock absorbing member, or the like. The general portion can be extended in a predetermined direction such as the right-left direction, the front-rear direction, the upper-lower direction, or the oblique direction. The general portion can be extended linearly or can be slightly bent after insertion of the inner member, or the like. That is, as long as the shock absorption performance of the wood member is ensured, the base member can be bent and deformed on the whole by the bending process. The bent-deformed portion can be formed by bending (curving or crooking) the outer member in an appropriate front, rear, right, left, upper, or lower direction. For example, the outer member can be bent in two directions such as rearward and upward. When providing a plurality of bent-deformed portions to the outer member, it is possible to set a bending direction per bent-deformed portion. The bent-deformed portions can be formed not only by bending and deforming the right and left sides of the outer member on the whole as illustrated in FIG. 1, but also by deforming a part of the front surface or the like of the outer member to a recessed shape. The shape of the outer member can also be changed as appropriate and can be formed into a hollow columnar shape such as a triangular prism or a square prism, or a hollow tubular shape such as a cylindrical shape or an oval cylindrical shape. The outer member may have a closed section over its entirety or may partially have an open section.

In the above-described mode, the configuration (shape, dimensions, number of arrangement, arrangement position, etc.) of the inner member 30 and the like is given by way of example, which is not intended to limit the configuration of the inner member in any aspect. In the above-described mode, the single inner member is disposed in the outer member, but a plurality of inner members can be disposed in the outer member. Further, it can be configured that the inner member is disposed at a portion where local folding of the general portion should be avoided (folding preventing portion) and that the inner member is not disposed intentionally (or a weak portion such as a recessed portion is provided to the wood member) at a portion where local folding of the general portion can be allowed (folding allowing portion). By intentionally weakening the folding allowing portion so as to be folded or bent in this way, it is possible to more reliably avoid unintended folding or bending of the folding preventing portion. When using a plurality of inner members, the axial direction of growth rings can be set per wood member, and, for example, the axial direction of the growth rings of the wood member can be made to coincide with the application direction of the load at the folding preventing portion. In consideration of an internal space of the outer member, the wood member can have various external shapes such as a columnar shape, for example, a prism shape or a cylindrical shape, or a plate shape. For example, it is possible to use a plurality of columnar or plate-like wood members by stacking them or placing them side by side.

The bracket can have a protruding portion according to the configuration of the outer member. When the outer member is bent at a right angle or an acute angle, it is possible to provide a hinge structure (e.g. integral hinge or the like) at a portion serving as the base point of bending of the protruding portion. As the bracket, it is possible to use a metal member and a solid-resin member in combination. It is sufficient for the bracket to be disposed to cover at least a part of the wood member in the state where the bracket can be held to the outer member. That is, instead of being disposed to envelop the wood member, the bracket can be provided integrally with a part (at least one of the end portions and the side surface portions) of the wood member. For example, the bracket can be provided only at each of the front side surface portion and the rear side surface portion (or the upper side surface portion and the lower side surface portion) of the wood member. In such a case, the brackets and the wood member can be integrated together by bolt-like fasteners or plate-like restrainers that are disposed to bridge the front side surface portion and the rear side surface portion. While it is sufficient for the mounting portion of the bracket to have a length equal to or greater than that of an outer surface portion of the corresponding wood member, it is desirable that the mounting portion have a single or a pair of protruding portions. The configurations of the inner members of the embodiment, the other example, and the modifications can be used in combination as appropriate.

In the above-described mode, the configuration (shape, dimensions, number of arrangement, arrangement position, etc.) of the holding structure 40 is given by way of example, which is not intended to limit the configuration of the holding structure in any aspect. For example, the holding structure can be formed only by the bent structure of the outer member and the inner member, or only by the fixing structure that fixes the metal and the resin to each other or the metals to each other. When the adhesive structure is employed as the holding structure, it is desirable to provide a projecting portion to one of the outer member and the bracket, and a recessed portion to the other one of them. For example, by performing adhesion or fusion bonding in the state where the projecting portion of the outer surface of the bracket is inserted in the recessed portion of the inner surface of the outer member, the positioning performance of them is improved, so that even when force is applied to the adhesive structure in a shear direction (e.g. the right-left direction in FIG. 3), it is possible to strongly resist this force. The configurations of the holding structures of the embodiment and the modifications can be used in combination as appropriate.

In the above-described mode, as the use of the shock absorbing member 10, the bumper reinforcement that is mounted on the front side of the vehicle is given by way of example. However, the shock absorbing member can be widely used as a vehicle exterior member or a vehicle interior member. For example, the shock absorbing member can be used as a bumper reinforcement that is mounted on the rear side or the lateral side of the vehicle, or as a part of the vehicle body (pillar, side member, or the like). Further, the shock absorbing member can be used as a part of a structure in a vehicle cabin, such as a door or a ceiling.

What is claimed is:

1. A shock absorbing member comprising:
an outer member that is hollow and made of a metal; and
an inner member held in the outer member, wherein:
the inner member includes a wood member and a bracket that is made of a solid resin or a metal and that is integral with the wood member;
the outer member includes (i) a central portion extending in a first predetermined direction that is orthogonal to a direction of an impact load to which the shock absorbing member is subjected during an impact, the wood member being disposed in the central portion, and (ii) first and second bent-deformed portions respectively located on opposite ends of the central portion in the first predetermined direction, the first and second bent-deformed portions being bent and deformed in a second predetermined direction, crossing the first predetermined direction, with respect to the central portion;
the wood member extends in a longitudinal direction that is parallel to the first predetermined direction; and
the inner member includes a holding structure configured to position and hold the bracket to the outer member, the holding structure including a bracket portion of the bracket, the bracket portion having first and second ends respectively extending beyond opposite ends of the wood member in the longitudinal direction, the first and second ends of the bracket portion being bent and deformed in the second predetermined direction to be in close contact with the first and second bent-deformed portions of the outer member adjacent to the opposite ends of the wood member.

2. The shock absorbing member according to claim 1, wherein:
the wood member has an outer surface portion extending in the longitudinal direction; and
the bracket portion is integrated with the outer surface portion of the wood member and has a length greater than a length of the outer surface portion in the longitudinal direction.

3. The shock absorbing member according to claim 1, wherein the bracket envelops the wood member.

4. The shock absorbing member according to claim 1, wherein the bracket is made of the solid resin which has flexibility.

5. The shock absorbing member according to claim 1, wherein the outer member has a columnar shape or a tubular shape.

6. The shock absorbing member according to claim 1, wherein the wood member has an elongated columnar shape or an elongated tubular shape.

7. A manufacturing method for a shock absorbing member including an outer member that is hollow and made of a metal, and an inner member held in the outer member, the manufacturing method comprising:
forming the inner member by integrating a wood member and a bracket made of a solid resin or a metal;
disposing the inner member in a base member that becomes the outer member, and then bending and deforming at least a part of the base member along with the bracket to form a bent-deformed portion of the outer member; and
positioning and holding the bracket to the outer member.

8. The manufacturing method according to claim 7, wherein the positioning and holding is positioning and holding a bracket portion of the bracket to the bent-deformed portion of the outer member, the bracket portion being bent and deformed along with the bent-deformed portion of the outer member.

9. The manufacturing method according to claim 7, wherein a bracket portion of the bracket that is bent and deformed along with the bent-deformed portion of the outer member protrudes beyond longitudinal ends of the wood member.

10. The manufacturing method according to claim 7, wherein:
(i) a general portion of the outer member that extends in a first predetermined direction with the wood member disposed in the general portion, and the bent-deformed portion of the outer member that is bent and deformed in a second predetermined direction, different from the first predetermined direction, with respect to the general portion are formed by the bending and deforming, and
(ii) the bent-deformed portion of the outer member is formed on each of both ends of the general portion in the first predetermined direction of the general portion, along with a bracket portion of the bracket that is bent and deformed along with the bent-deformed portion of the outer member.

* * * * *